United States Patent
Huang et al.

(10) Patent No.: US 10,552,037 B2
(45) Date of Patent: Feb. 4, 2020

(54) SOFTWARE KEYBOARD INPUT METHOD FOR REALIZING COMPOSITE KEY ON ELECTRONIC DEVICE SCREEN WITH PRECISE AND AMBIGUOUS INPUT

(71) Applicant: Shanghai Chule (CooTek) Information Technology Co. Ltd., Shanghai (CN)

(72) Inventors: Xiaofeng Huang, Shanghai (CN); Yanjiao Zhao, Shanghai (CN); Xiaoshan Tao, Shanghai (CN)

(73) Assignee: Shanghai Chule (CooTek) Information Technology Co. Ltd., Shanghai (CN)

( * ) Notice: Subject to any disclaimer, the term of this patent is extended or adjusted under 35 U.S.C. 154(b) by 169 days.

(21) Appl. No.: 15/178,043

(22) Filed: Jun. 9, 2016

(65) Prior Publication Data
US 2016/0306546 A1   Oct. 20, 2016

Related U.S. Application Data

(63) Continuation of application No. 12/680,830, filed as application No. PCT/CN2008/072599 on Oct. 6, 2008, now abandoned.

(30) Foreign Application Priority Data

Sep. 30, 2007   (CN) .......................... 2007 1 0046742

(51) Int. Cl.
*G06F 3/0488* (2013.01)
*G06F 3/023* (2006.01)
*G06F 3/0484* (2013.01)

(52) U.S. Cl.
CPC ........ *G06F 3/04886* (2013.01); *G06F 3/0237* (2013.01); *G06F 3/04842* (2013.01)

(58) Field of Classification Search
CPC ...... G06F 3/017; G06F 3/018; G06F 3/03547; G06F 3/0412; G06F 3/0416;
(Continued)

(56) References Cited

U.S. PATENT DOCUMENTS

| 5,953,541 | A | 9/1999 | King et al. |
| 6,292,179 | B1 * | 9/2001 | Lee ...................... G06F 3/0236 345/173 |

(Continued)

FOREIGN PATENT DOCUMENTS

| CN | 1777858 A | 5/2006 |
| WO | 2000075765 A1 | 12/2000 |

*Primary Examiner* — Keith L Crawley
(74) *Attorney, Agent, or Firm* — Flener IP & Business Law; Zareefa B. Flener

(57) ABSTRACT

A software keyboard input method for implementing compound keys on an electronic device screen is provided to assist a user in fast inputting a text with convenience and efficiency. Two letters are displayed on a key. The user performs a ambiguous input by directly clicking a key, and performs a precise input by moving a contact point via which a fast selection of a symbol and a fast switching of a uppercase letter are realized. With the software keyboard input method for implementing compound keys on an electronic device screen, information can be inputted on the electronic device screen easily and accurately. The method is of convenient usage and flexibility.

16 Claims, 8 Drawing Sheets

(58) Field of Classification Search
CPC .. G06F 3/0426; G06F 3/0488; G06F 3/04886; G06F 3/04895; G06F 3/04897; G06F 3/0237; G06F 3/04842
See application file for complete search history.

(56) References Cited

U.S. PATENT DOCUMENTS

| | | | |
|---|---|---|---|
| 6,295,052 B1* | 9/2001 | Kato | G06F 3/04883 341/21 |
| 8,405,601 B1 | 3/2013 | Beale | |
| 2002/0033285 A1 | 3/2002 | Afanasiev | |
| 2003/0014239 A1 | 1/2003 | Ichbiah et al. | |
| 2004/0263487 A1* | 12/2004 | Mayoraz | G06F 3/0481 345/173 |
| 2006/0007162 A1 | 1/2006 | Kato | |
| 2006/0055669 A1 | 3/2006 | Das | |
| 2006/0082540 A1* | 4/2006 | Prior | G06F 1/1626 345/156 |
| 2006/0119582 A1* | 6/2006 | Ng | G06F 3/04883 345/168 |
| 2006/0227116 A1* | 10/2006 | Zotov | G06F 3/0418 345/173 |
| 2007/0109149 A1* | 5/2007 | Deas | G06F 3/0237 341/22 |
| 2007/0152978 A1 | 7/2007 | Kocienda et al. | |
| 2008/0033713 A1 | 2/2008 | Broström | |

* cited by examiner

100

| q w ; | e r ? | t y , | u i ' | o p " |
|---|---|---|---|---|
| a s * | d f - | g h . | j k ! | l \ |
| space | z x ( | c v : | b n ) | m / |

101 — (left) 102 — (right) 104 — (lower-left) 103 — (lower-right)

| q w ; | e r ? | t y , | u i ' | o p " |
|---|---|---|---|---|
| a * | s d - | f g . | h j ! | k l \ |
| space | z x ( | c v : | b n ) | m / |

201 — (left) 202 — (right)

| q  w  ; | e  r  ? | t  y  , | u  i  ' | o  p  " |
|---|---|---|---|---|
| a  s  * | d  f  - | g  h  . | j  k  ! | l  m  \ |
| space | z  x  ( | c  v  : | b  n  ) |  |

| q  w  ; | e  r  ? | t  y  , | u  i  ' | o  p  " |
|---|---|---|---|---|
| a  s  * | d  f  - | g  h  . | j  k  ! | l  &  \ |
| space | z  x  ( | c  v  : | b  n  ) | m  @  / |

FIG.4

SOFTWARE KEYBOARD INPUT METHOD FOR REALIZING COMPOSITE KEY ON ELECTRONIC DEVICE SCREEN WITH PRECISE AND AMBIGUOUS INPUT

CROSS REFERENCE TO RELATED APPLICATIONS

This instant application is a continuation application of, and claims priority to, U.S. patent application Ser. No. 12/680,830, filed Jul. 19, 2010, which is a 371 national stage application of PCT/CN2008/072599, filed Oct. 6, 2008, which claims the benefit of priority from Chinese Patent Application No. 200710046742.8 filed on Sep. 30, 2007, the content of which is incorporated herein by reference in its entirety.

FIELD OF THE INVENTION

The present invention relates to a field of electronic device screen, particularly to a field of inputting information on an electronic device screen, and more specifically, to a software keyboard input method for implementing compound keys on an electronic device screen.

BACKGROUND

In modern life, various kinds of electronic devices having touch screen come into existence with the continual development of integrated circuit technology. These numerous electronic devices having touch screen (e.g., palmtop computer, intelligent mobile phone, embedded system, pocket computer, etc.) fail to be equipped with a complete hardware keyboard due to the restriction of size, fabrication cost, etc. Thus, the input on such devices is generally realized by software simulation.

Usually, in prior art, the conventional software keyboard may bring much inconvenience to users. This is largely due to a small area of the touch screen and a plenty of contents to be selected. Accordingly, the corresponding selection area on the screen is relatively small. The user may therefore fail to input by accurately clicking the selection area on the screen directly via a finger. Instead, the user usually has to employ other equipments with smaller contact point resolution, e.g., a touch pen.

In general situations, it requires the user to employ both hands simultaneously for operation, i.e., one hand for holding the electronic device, another hand for inputting by clicking the touch screen via a touch pen. Even so, in some cases, in a running car for example, even with other equipments, the user may yet possibly fail to accurately select a content to be input, which is effected by the circumstance, e.g., shaking.

SUMMARY

The present invention aims at overcoming the drawbacks of the foregoing prior art, and provides a software keyboard input method for implementing compound keys on an electronic device screen, where the method has the characteristics of inputting information on the electronic device screen easily and accurately, simple implementation, convenient usage, stable and reliable working performance, wide range of application.

To this end, the software keyboard input method for implementing compound keys on an electronic device screen according to the present invention is as follows.

According to a first aspect of the present invention, a software keyboard input method for implementing compound keys on an electronic device screen is provided. The method includes, a first step of displaying a plurality of keys on a tactile display device, wherein at least some keys present a plurality of letters; a second step of detecting a contact point motion on the key performed by a user; a third step of determining a content corresponding to the present key-press performed by the user; and a fourth step of inputting a user selection to an editing text.

According to a second aspect of the present invention, a portable electronic device is provided, where the portable electronic device adopts the software keyboard input method for implementing compound keys on an electronic device screen according to the first aspect of the present invention.

BRIEF DESCRIPTION OF THE DRAWINGS

FIG. 1 is a schematic illustrating a software keyboard layout according to a first embodiment of the present invention;

FIG. 2 is a schematic illustrating a software keyboard layout according to the first embodiment of the present invention;

FIG. 3 is a schematic illustrating a software keyboard layout according to the first embodiment of the present invention;

FIG. 4 is a schematic illustrating a software keyboard layout according to the first embodiment of the present invention;

DETAILED DESCRIPTION

Figure 5:
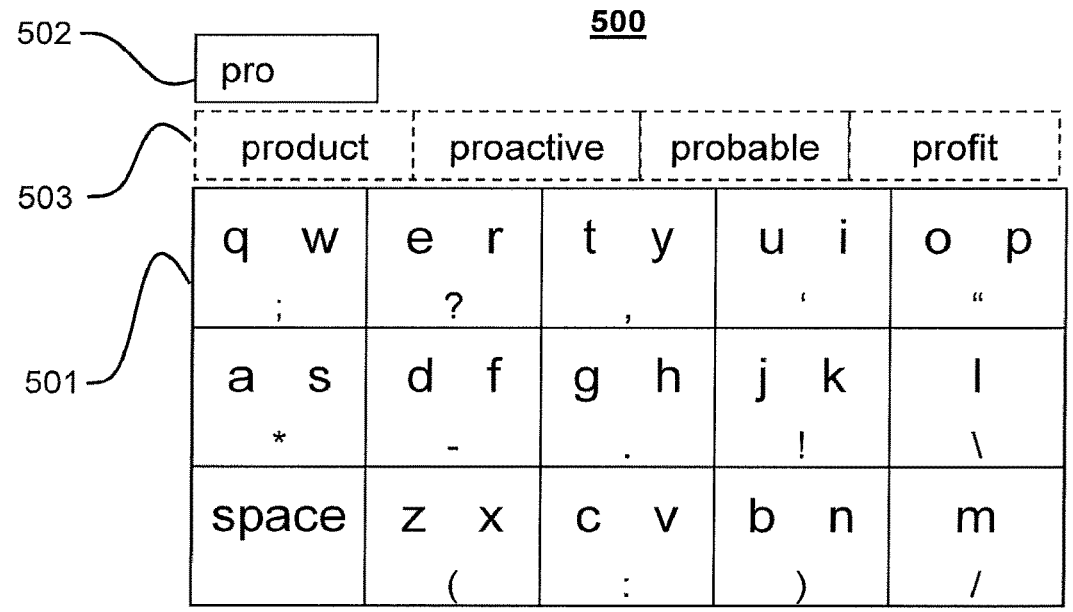
FIG. 5 is a schematic illustrating a software keyboard layout according to the first embodiment of the present invention, where a candidate area and an inputted letter area are included.

The software keyboard input method according to the present invention may be applied to various electronic devices having a touch screen, especially a portable electronic device such as a mobile phone, a PDA, a laptop computer, etc.

The following embodiments are specifically illustrated for a better understanding of the technical contents of the present invention.

First, it should be noted that English input is taken as an example in all the following embodiments. However, the method according to present invention is not limited to the kind of language. The method according to present invention may also be applied to various languages such as Chinese, Japanese, German, etc. A software keyboard version that meets the requirements of different languages may be designed by only a fine adjustment of the keyboard layouts illustrated in the following embodiments.

First Embodiment

The present embodiment illustrates an input method for fast and easily inputting word, symbol, and switching uppercase and lowercase letter on a software keyboard layout having compound keys.

FIG. 1 illustrates a software keyboard layout 100 used in the input method relating to the present invention. According to the letter layout of the present keyboard which is based on a standard keyboard layout (QWERTY keyboard layout) of personal computer, two letters and one or more symbols are combined on one key. For example, letters "q" and "w", together with symbol ";" share a key 101. In a special case, letter "l" and letter "m" occupy a separate key 102 and a key 103, respectively.

For ease of illustration, a specific symbol is depicted in the location of the symbol. It is apparent that the essentials of the present invention will totally not be affected by adding, deleting, changing the symbols on the keys, changing the symbol into a number or other symbol, or modifying its layout.

Both the rows where key 102 and key 103 locate have the odd number of letters. Thus, there are only one letter on the key 102 and key 103. However, we may also modify and adjust the key layout, as shown in FIG. 2, i.e., put letter "a" on the key 201 separately, and adjust other letters accordingly.

As shown in FIG. 3, according to some embodiments, "l" and "m" may be combined in the key 302.

As shown in FIG. 4, according to some embodiments, a symbol may be combined in the right part of the key 402 and the key 403, respectively.

In addition, the location of the space key 104 in FIG. 1 may also be adjusted optionally (e.g., at the middle or right part of the row where it locates, or displayed at the fourth row, etc.), and other keys may be adjusted accordingly. This will not compromise the essentials of the present invention.

An ordinary person skilled in the art may also, based on the keyboard layout, add one or more grids, one or more rows, one or more columns of keys or buttons. All of these will not compromise the essentials of the present invention as long as the double-letter layout of the keyboard is not changed.

Based on the keyboard layout area 100 as shown in FIG. 1, the input method may also contain a word candidate area for displaying a list of possible words that the user may desire to input, and contain an inputted letter area for displaying the actual input of the user. For example, a software keyboard 500 having a keyboard layout area 501, an inputted letter area 502 and a word candidate area 503 is illustrated in FIG. 5. The content that the user actually presses is already displayed in the inputted letter area 502. According to the input method, the possible words that the user may input are displayed in the candidate area 503, where the possible words are predicted based on the inputted key-presses. The user may click a word in the candidate area and input it to the editing text.

The candidate area may be displayed in a fixed area of the screen, or may be displayed in an area near the cursor in the current editing text. There may be none or any number of the candidate words (within the range allowed by the screen) in the candidate area. The inputted letter area 502 may be displayed in a fixed area of the screen, or may be displayed in an area near the cursor in the editing text. These will not compromise the essentials of the present invention.

According to the first embodiment of the present invention, a software keyboard based on a letter layout of a standard keyboard (QWERTY keyboard) of personal computer is displayed, and two letters and/or one or more symbols are combined on one key. Thus, benefits such as displaying larger key-presses on the screen with a limited size and reducing keystroke errors are achieved. Of course, it is appreciated by a person of ordinary skill in the art that although the first embodiment of the present invention is illustrated by way of the layout similar to the QWERTY keyboard, other keyboard layouts may also adopt the input method according to the present invention as long as two or more letters are combined on one key.

The following discussion will be made to an embodiment of a software keyboard input method based on the keyboard layout 500 as shown in FIG. 5.

Ambiguous Input Approach

The ambiguous input approach means that when the user directly presses a key on the keyboard, the input method may search possible candidate words in a dictionary based on the contents that the user has inputted already, and may display a word list in the candidate area according to the word frequency. The dictionary herein may be an information database stored in the form of files, which may include all or parts of English words and other forms, or may further include user-defined words, or may further include information of the frequency of use of each word, information of a phrase combination, or a semantic model, etc.

Figure 6:
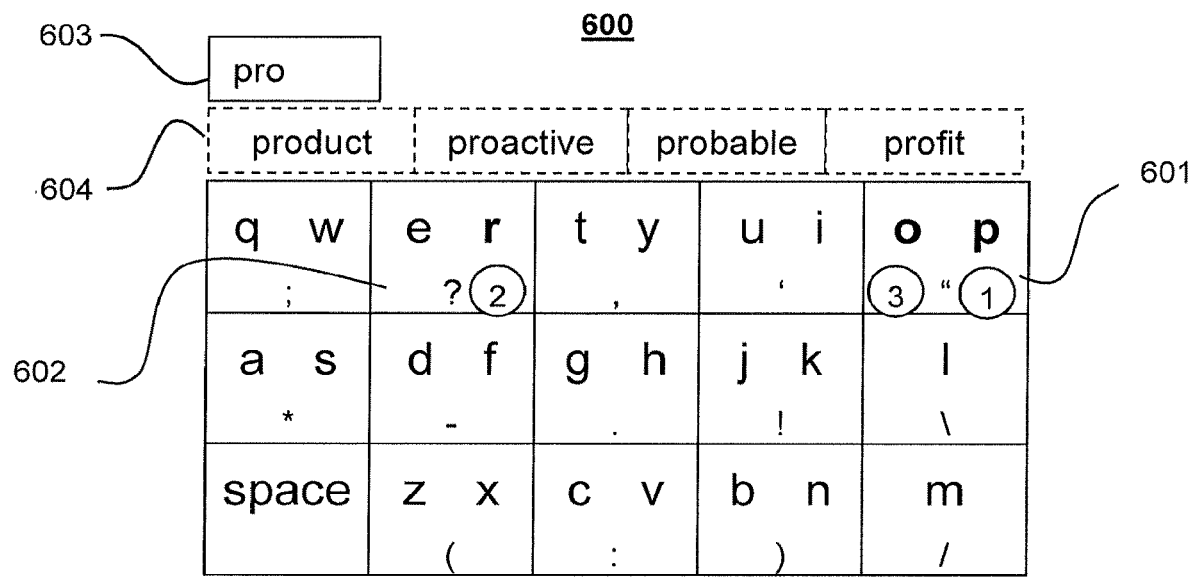
FIG. 6 is a schematic illustrating a software keyboard layout according to the first embodiment of the present invention, where an ambiguous input method is depicted.

For example, as shown in FIG. 6, assume that the user desires to input a word "product". When the user presses keys 601, 602 and 601 in sequence, although the key 601 includes "p" and "o" at the same time, and the key 602 includes "e" and "r" at the same time, the input method may enumerate, based on the sequence of these three inputted keys, all the words in the dictionary with their first three letters meeting the inputted keys. And, the input method may display several words with the highest frequency, e.g., "product", "proactive", "probable", "profit", in the candidate area 604.

In some embodiments, the candidate words may possibly be adjusted based on the context of the editing text, and further based on the semantic model. Therefore, most probable candidate words in the context herein may be displayed in the candidate area.

In the inputted letter area 603, the letters that the user already inputted are displayed. Since three key-presses may represent a plurality of letter combinations at this point, the area may display three initial letters of the first candidate word, e.g., "pro". With the continuation of input, the first candidate word will be changed constantly, and therefore the letters in this area will be adjusted dynamically.

The user may click a candidate word in the candidate area 604 and input it to a target text field. For example, the user may click and input the candidate word "product". When the desired input is the first candidate word, the user may press a shortcut key (e.g., a space key) to input it directly. Or, the user may click the combination of the inputted letters in the inputted letter area 603, and input "pro" in the text.

When the user clicks the combination of the inputted letters which is not included in the dictionary, the system may indicate the user or automatically add the combination into the dictionary.

The symbol on the key will not function during the ambiguous input. The method merely considers the letters on the key. When there is only one letter on a key (e.g., the key 102 in FIG. 1 and the key 402 in FIG. 4), the effect thereof equals a precise input approach in the following description.

Precise Input Approach

The precise input approach means that the user may press a key, and then release the key after moving for a certain distance, achieving the goal of precisely inputting a character or a symbol.

Figure 7:
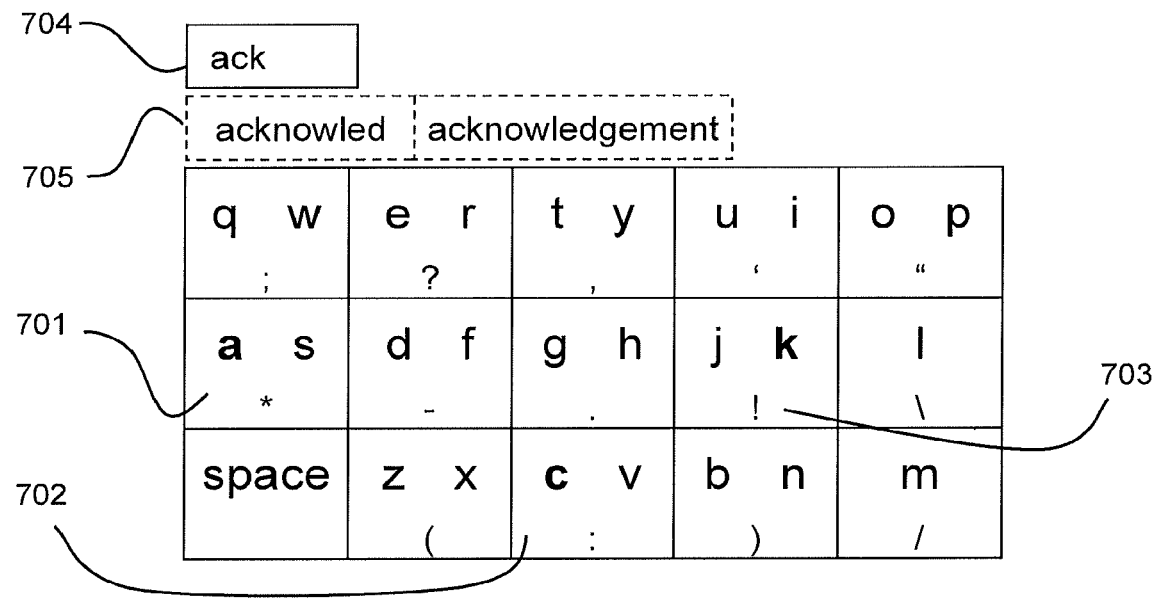
FIG. 7 is a schematic illustrating a software keyboard layout according to the first embodiment of the present invention, where a precise input method is depicted.

For example, as shown in FIG. 7, it assumes that the user desires to input the word "acknowledge". To improve the accuracy of the candidate words, the user may precisely input the first three letters "ack". The user may press the key 701, and then release the key 701 after moving a contact point leftwards for a certain distance (e.g., more than 10 pixels), and thereby the letter "a" is inputted. The user may press the key 702, and then release the key 702 after moving leftwards for a certain distance, and thereby the letter "c" is inputted. The user may press the key 703, and then release the key 703 after moving rightwards for a certain distance, and thereby the letter "k" is inputted. At this point, the input method may search all the words starting with "ack" in the dictionary, and display them in the candidate area 705.

The precise input and the ambiguous input may be used at the same time. For example, the user may first precisely input "a" (press the key 701 and then release the key 701 after moving leftwards), then ambiguously input "c" and "k" (press the key 702 and the key 703 and then release the key directly). The input method may also search all the matching words in the dictionary, and display them in the candidate area.

The distance for moving the contact point may be any predetermined value, or may be configured by the user. This will not compromise the essentials of the present invention.

Inputting a User-Defined Word

Sometimes the words that user desires to input are not included in the dictionary, for example, some rare words, abbreviations, slangs, or dedicated terms, etc. Since the precise input approach is provided, the user may easily input the words not included in the dictionary.

For example, as shown in FIG. 7, when the user desires to input the word "ack" which is not included in the word library, the user may precisely input "ack", and directly click the inputted letter area 704 to input the word "ack" to the editing text.

Fast Inputting Punctuations, Numbers or Other Symbols

Figure 8:
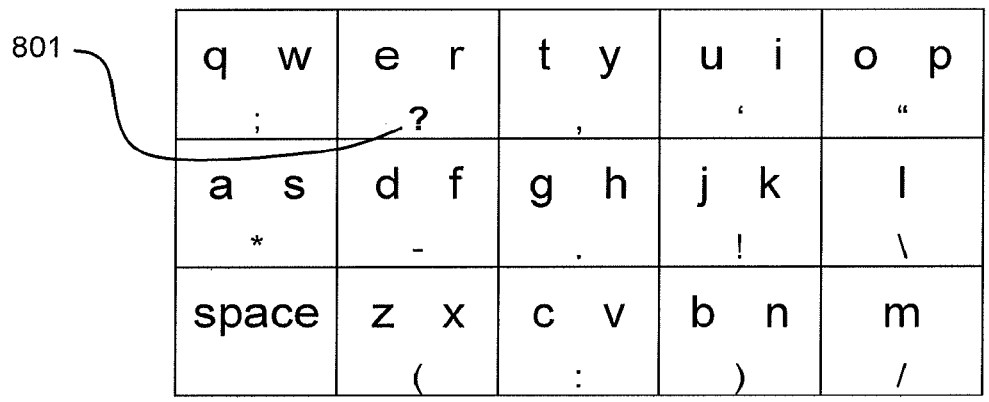
FIG. 8 is a schematic illustrating a software keyboard layout according to the first embodiment of the present invention, where a symbol input method is depicted.

The user may fast input punctuations, numbers or other symbols via a contact point motion on a key. For example, as shown in FIG. 8, the user may input the punctuation "?" in the following way: press the key 801, then release the key 801 after moving the contact point downwards for a certain distance.

Of course, it is appreciated by a person of ordinary skill in the art that other approaches may also be employed for inputting punctuations, e.g., inputting the punctuation "?" by way of clicking the key 801 and then holding for a period (long-press).

In some embodiments, one or more symbols may be combined on one key. As shown in FIG. 4, when the user presses the key 402 and moves the contact point rightwards for a certain distance, thus, the symbol "&" is inputted. Similarly, in some embodiments, the symbol may be combined on the key at an upper part, a lower part, a left part, a right part, an upper left part, an upper right part, a lower left part, a lower right part, etc. The user may input the corresponding symbol by moving the contact point towards the symbol.

Fast Switching Uppercase and Lowercase

Figure 9:
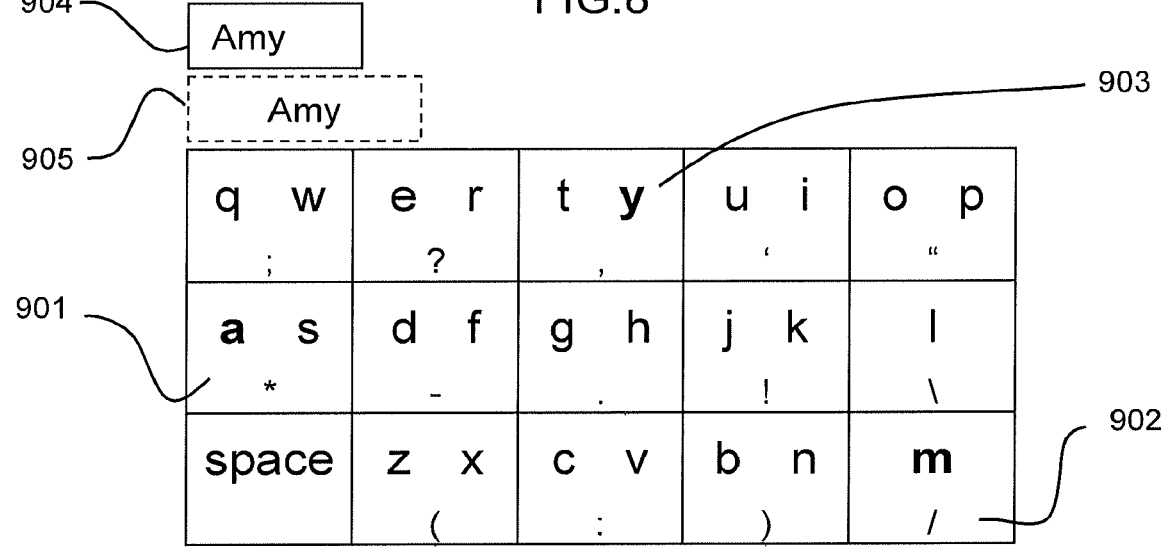
FIG. 9 is a schematic illustrating a software keyboard layout according to the first embodiment of the present invention, where a method for switching uppercase letter and lowercase letter is depicted.

The user may fast switch and input uppercase and lowercase letter via a contact point motion on the key. For example, as shown in FIG. 9, assume the user desires to input the word "Amy", and assume that the word is already included in the dictionary. Thus, the user may perform the following steps.

The user may press the key 901, then release the key 901 after moving the contact point upwards for a certain distance, and thereby the uppercase letter "A" or "S" is inputted ambiguously. Next, the user may press the keys 902 and 903 in sequence. The word "Amy" is presented in the candidate area 905.

If "Amy" is not included in the dictionary, the user may perform the following steps. The user may press the key 901, then release the key 901 after moving the contact point upper-left to a certain position, and thereby the uppercase letter "A" is inputted. Next, the user may precisely input "m" (press the key 902) and "y" (press the key 903, and then move the contact point rightwards).

The determination method regarding moving the contact point upper-left to a certain position may be as follows. Compare coordinates of a position where the contact point is pressed with coordinates of a position where the contact point is released. It is regarded that switching to uppercase letter is conducted, when the latter position locates at the upper-left part of the former position, the difference between the x-axis of the two positions is larger than a certain value, and the difference between the y-axis of the two positions is larger than a certain value.

Of course, other contact point motions may also be employed for switching uppercase and lowercase. For example, in some embodiments, the uppercase letter "A" or "S" may be inputted ambiguously by way of pressing the key 901 and holding the key 901 for a period (long-press). The uppercase letter "A" may be precisely inputted by pressing the key 901, then long-pressing the key 901 after moving leftwards for a certain distance. The uppercase letter "S" may be precisely inputted by pressing the key 901, then long-pressing the key 901 after moving rightwards for a certain distance.

For another example, in some embodiments, press the key 901, and then move the contact point upwards to a certain distance and then move back to switch to the uppercase mode "A" or "S". Next, continue to move the contact point leftwards or rightwards to precisely input the letter "A" or "S".

It is to be noted that the method described herein is not only applicable to the situation of switching the lowercase letter to the uppercase letter, but also applicable to the situation of switching the uppercase letter to the lowercase letter. For example, when the default status of the keyboard is the uppercase, all of the foregoing contact point motions may be employed for fast switching the uppercase to the lowercase letter.

Indication Area

Since the user requires to precisely input word, symbol, and switch uppercase and lowercase letter via a contact point motion (e.g., moving for a certain distance, or long-pressing for a period, etc.), the user may need a kind of indication information for confirming whether the input contents that the system determines are the contents that the user desires to input.

This can be achieved by setting an indication area, where the indication area is configured to indicate the contexts inputted currently to the user. In normal situation, the indication area may be hidden. When the user presses a certain key, the indication area may be presented above the key, and the contexts to be inputted currently may be displayed dynamically with the change of the contact point motion. For example, when the user presses the key "a s", the amplified "a s" is displayed in the indication area above the key. When the contact point is moved leftwards for a certain distance, the amplified "a" is displayed in the indication area. When the contact point is moved rightwards for a certain distance, the amplified "s" is displayed in the indication area. When the contact point is moved downwards for a certain distance, the symbol "*" is displayed. When the contact point is moved upwards for a certain distance, the uppercase letter "A S" is displayed. When the contact point is moved upper-left, the uppercase letter "A" is displayed. When the contact point is moved upper-right, the uppercase letter "S" is displayed.

Such kind of indication area is optional.

Figure 10:
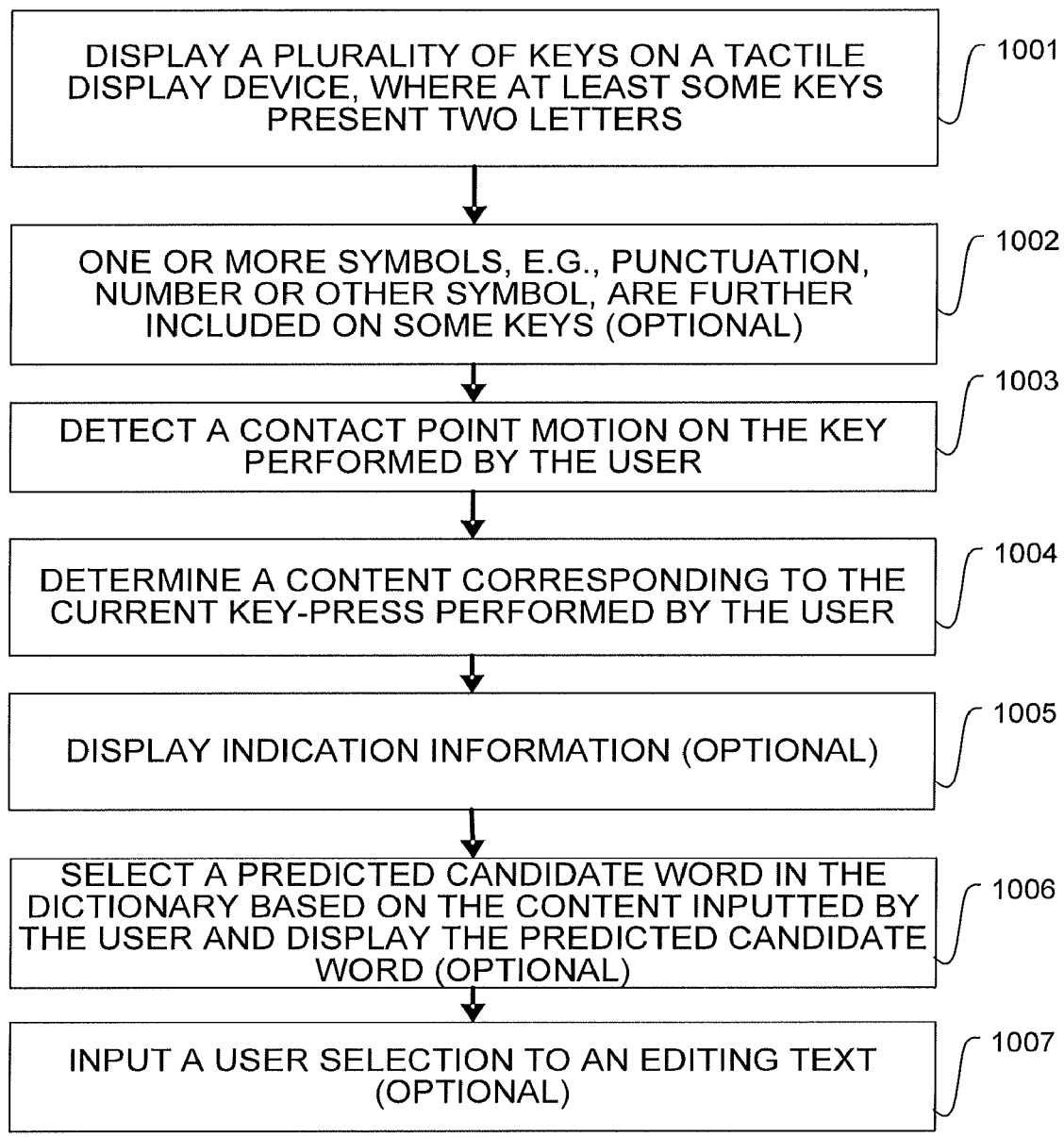
FIG. 10 is a flowchart illustrating an input procedure of a software keyboard according to the first embodiment of the present invention.

FIG. 10 is a flowchart illustrating a procedure of the input method according to the first embodiment of the present invention. The procedure includes the following steps. Step 1001: Display a plurality of keys on a tactile display device, where at least some keys present two letters. Step 1002 (optional): One or more symbols (e.g., punctuation, number or other symbol) are further included on some keys. Step 1003: Detect a contact point motion on the key performed by the user. Step 1004: Determine a content corresponding to the current key-press performed by the user. Step 1005 (optional): Display indication information of a current input. Step 1006 (optional): Select a predicted candidate word in the dictionary based on the content inputted by the user and display the predicted candidate word. Step 1007 (optional): Input a user selection to an editing text.

In terms of step 1001, the keyboard layout thereof may be the QWERTY keyboard layout. When there are two letters on the key, the letters may be in a horizontal layout. Some examples of the keyboard layout may be referred to FIG. 1, FIG. 2, FIG. 3 and FIG. 4. However, the present invention is not limited to these layouts.

In terms of step 1002, when there is one or more symbols on the key, these symbols may be located on the key at an upper part, a lower part, a left part, a right part, a lower left part, a lower right part, an upper left part, or an upper right part. The position of the symbols may be adjusted appropriately based on the position of the existing letter. In some embodiments, the symbol may not be displayed. Thus, this step is optional.

In terms of step 1003, the contact point motion may include pressing and then directly releasing the key; pressing the key, and then releasing the key after moving the contact point towards a certain direction for a certain distance; long-pressing the key over a specified period; moving the contact point and then holding on over a specified period, etc.

In terms of step 1004, the determination method may include the following substeps.

1) If the contact point motion is pressing and then directly releasing the key, then it is determined that the content of the present input is any one of the letters on the key, where the content is determined after a certain candidate word in the dictionary is selected by the user, i.e., the ambiguous input approach.

2) If the contact point motion is pressing the key, and then releasing the key after moving the contact point towards a direction of a certain letter for a certain distance, then it is determined that the content of the present input is the letter in such direction on the key, i.e., the precise input approach. For example, in FIG. 9, the letter "a" is inputted by moving leftwards on the key 901, and the letter "s" is inputted by moving rightwards. (optional)

3) If the contact point motion is pressing the key, and then releasing the key after moving the contact point towards a direction of a certain symbol for a certain distance, then it is determined that the content of the present input is the symbol in such direction on the key. For example, in FIG. 9, the symbol "*" is inputted by moving downwards on the key 901. The contact point motion may also be long-pressing the key over a specified period, and then inputting the symbol. For example, in FIG. 9, the symbol "*" is inputted after long-pressing the key 901. (optional)

4) If the contact point motion is releasing the key after moving the contact point upwards for a certain distance, then it is determined that the content of the present input is the capital form of any one of the letters on the key, i.e., also the ambiguous input approach. (optional)

5) If the contact point motion is releasing the key after moving the contact point upper-left for a certain distance, then it is determined that the content of the present input is the capital form of the left letter on the key. If the contact point motion is releasing the key after moving the contact point upper-right for a certain distance, then it is determined that the content of the present input is the capital form of the right letter on the key. For example, in FIG. 9, the uppercase letter "A" is inputted by moving upper-left on the key 901, and the letter "S" is inputted by moving upper-right. (optional)

6) The contact point motion in the substeps 4) and 5) may be changed to releasing the key after long-pressing the key over a specified period for inputting the uppercase letter. For example, in FIG. 9, the uppercase letter "A" or "S" is ambiguously inputted by long-pressing the key 901 over a period. The uppercase letter "A" may be precisely inputted by long-pressing the key 901 after moving the contact point leftwards for a certain distance. The uppercase letter "S" may be precisely inputted by long-pressing the key 901 after moving the contact point rightwards for a certain distance. (optional)

In terms of step 1005, the contents of the current input may be dynamically amplified and displayed in the indication area (e.g., above the pressed key).

In terms of step 1006, the input method may search, based on the combination of the letters inputted by the user (which may include precise input and ambiguous input), the words in the dictionary (which may include a user-defined dictionary), and may display the possible candidate words in the candidate area.

In terms of step 1007, the user may directly click a candidate word in the candidate area to input it to the editing text, or may use a shortcut key (e.g., SPACE or Enter key) to automatically input the first candidate word to the editing text. When the word that the user desires to input is not included in the candidate word list, the letter inputted already may be directly inputted to the text.

Although the procedure 1000 of the input method includes a series of steps performed in sequence, apparently, the procedure may include more or fewer steps. And the steps may be performed in series or in parallel (e.g., using a multithread processor), or several steps may be combined into one step, or only the combination of some steps may be selected, or other contact point motions may be adopted. For example, it is very easy for a person of ordinary skill in the art to design an input method based on the essence of the present invention, where the symbol is not displayed (i.e., without step 1002) while the double-letter layout as well as ambiguous and precise input approaches are still adopted; or to design another input method, where substeps 4), 5), or 6) in step 1004 are omitted, i.e., without fast switching uppercase and lowercase letter; or to design another input method, where the condition of the contact point motion in step 1004 is changed to inputting the symbol by double-click, etc. Apparently, such changes will not compromise the essentials of the present invention.

The foregoing layouts are designed based on English keyboard. However, it is readily appreciated by a person of ordinary skill in the art that the layouts may also be applied to a keyboard in other languages, e.g., German keyboard, French keyboard, etc. The keyboards in these languages may differ in their letters and layouts. However, the method of the present invention may also be adopted, as long as the keyboards are modified similarly to the double-letter layout of the present design by referring to the computer keyboard layout, to thereby achieve the benefits of accelerating the input efficiency and rate, reducing input errors, and so forth. Therefore, such changes will not compromise the essentials of the present invention either.

Embodiment Two

The ambiguous input approach included in the software keyboard input method described in the first embodiment may be applied to a lot of scenarios of text input. However, when the user needs to input a dedicated term on an electronic device, such as password, personal name, palace name, etc., the ambiguous input approach may not exhibit its advantage, but may affect the input rate. At this point, there is a need for a method for merely providing precise input.

The present embodiment describes a method for precise input. When the user presses a key and moves a contact point, a letter in the movement direction is inputted. When the user presses the contact point and directly releases the contact point, the input letter is determined based on the initial position of the contact point.

The software keyboard layout in the present embodiment is similar to the keyboard layout in the first embodiment, as shown in FIG. 2.

In addition, the input approach in the present embodiment is also similar to that in the first embodiment, including precise input for a letter, input for a symbol, fast input for a uppercase letter, etc. But the difference lies in that there is no ambiguous input in the present embodiment.

Figure 11:
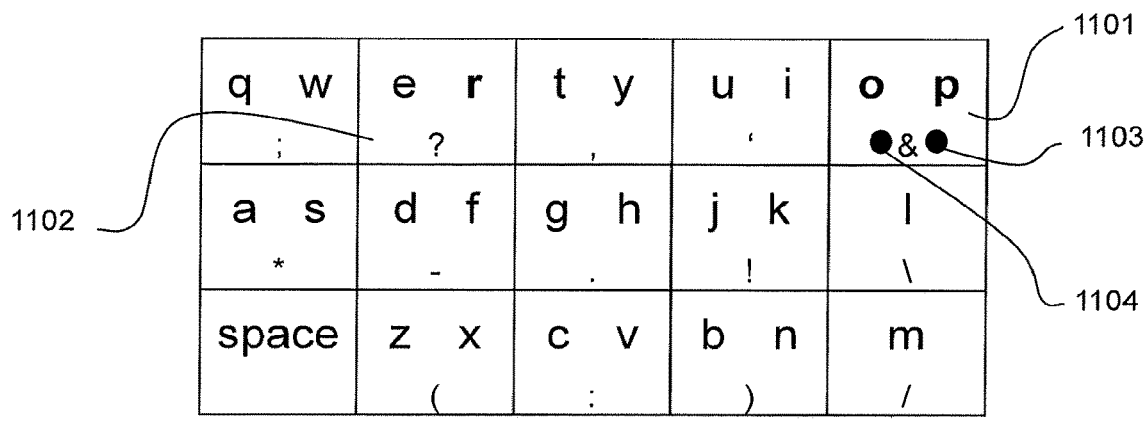
FIG. 11 is a schematic illustrating a software keyboard layout according to a second embodiment of the present invention.

As shown in FIG. 11, when the user presses the key 1101, and releases the contact point after moving leftwards for a certain distance, the letter "o" is inputted. When the user presses the key 1101, and releases the contact point after moving rightwards for a certain distance, the letter "p" is inputted.

Unlike the first embodiment, when the user presses the key 1101 and releases it directly, it is determined whether the input letter is "o" or "p" based on the initial position of the contact point, rather than performing the ambiguous input. If the contact point locates at the left part of the key, "o" is inputted; otherwise, "p" is inputted. For example, in FIG. 11, assume that the contact point is pressed at the position of dot 1104, "o" is inputted since the dot is at the left part of the key. If the contact point is pressed at the position of dot 1103, "p" is inputted since the dot is at the right part of the key.

The width of the key may be set to an even number of pixels to avoid the situation that the contact point is exactly at the middle position of the key. Or, the system may specify that the middle position indicates a letter at the left part or a letter at the right part.

Similar to the first embodiment, the present embodiment may input the symbol, switch the uppercase letter and the lowercase letter, via the contact point motion. For example, when the user presses the key 1101, then releases the key 1101 after moving the contact point downwards for a certain distance, the symbol "&" may be inputted. When the user presses the key 1101, then releases the key 1101 after moving the contact point upper-left or upper-right for a certain distance, the uppercase letter "O" and "P" may be inputted.

Figure 12:
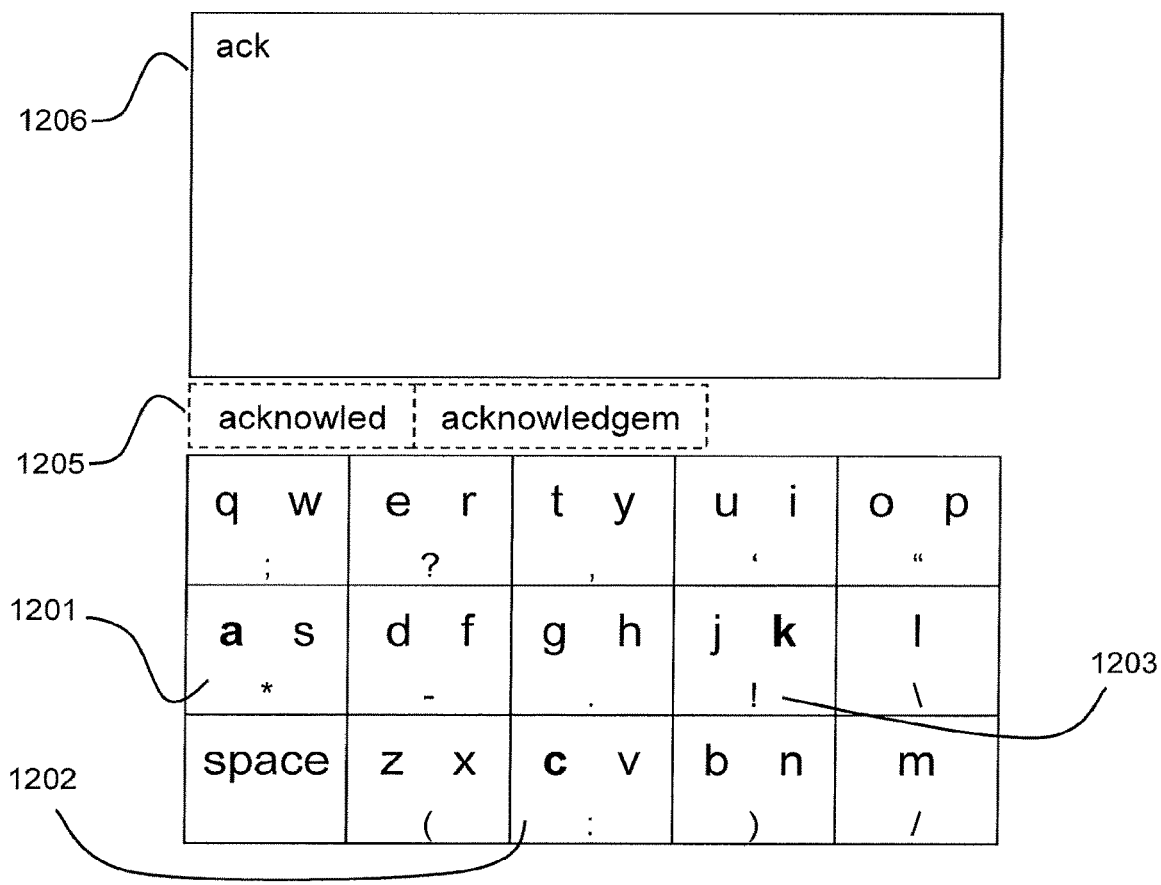
FIG. 12 is a schematic illustrating a software keyboard layout according to the second embodiment of the present invention, where a candidate area is included.

Since there is no ambiguous input, the keyboard layout of the present embodiment needs no candidate area. The user may directly input the symbol to the editing text upon each key-press. Of course, in some embodiments, the candidate area may still be displayed for predicting the user input. For example, in FIG. 12, after the user precisely inputs the letters "a", "c", "k" in sequence, "ack" is directly presented in the editing text area 1206. And the candidate words predicted by the system, such as "acknowledge", "acknowledgement", etc., are presented at the candidate area 1205 at the same time. The user may input the desired predicted word via a click or a corresponding shortcut key, to thereby accelerate the input rate. The candidate area is optional.

Similarly, in order to indicate the input content that is currently determined to the user, an indication area as described in the first embodiment may be displayed for dynamically displaying the content to be inputted currently. The indication area is also optional.

Figure 13:
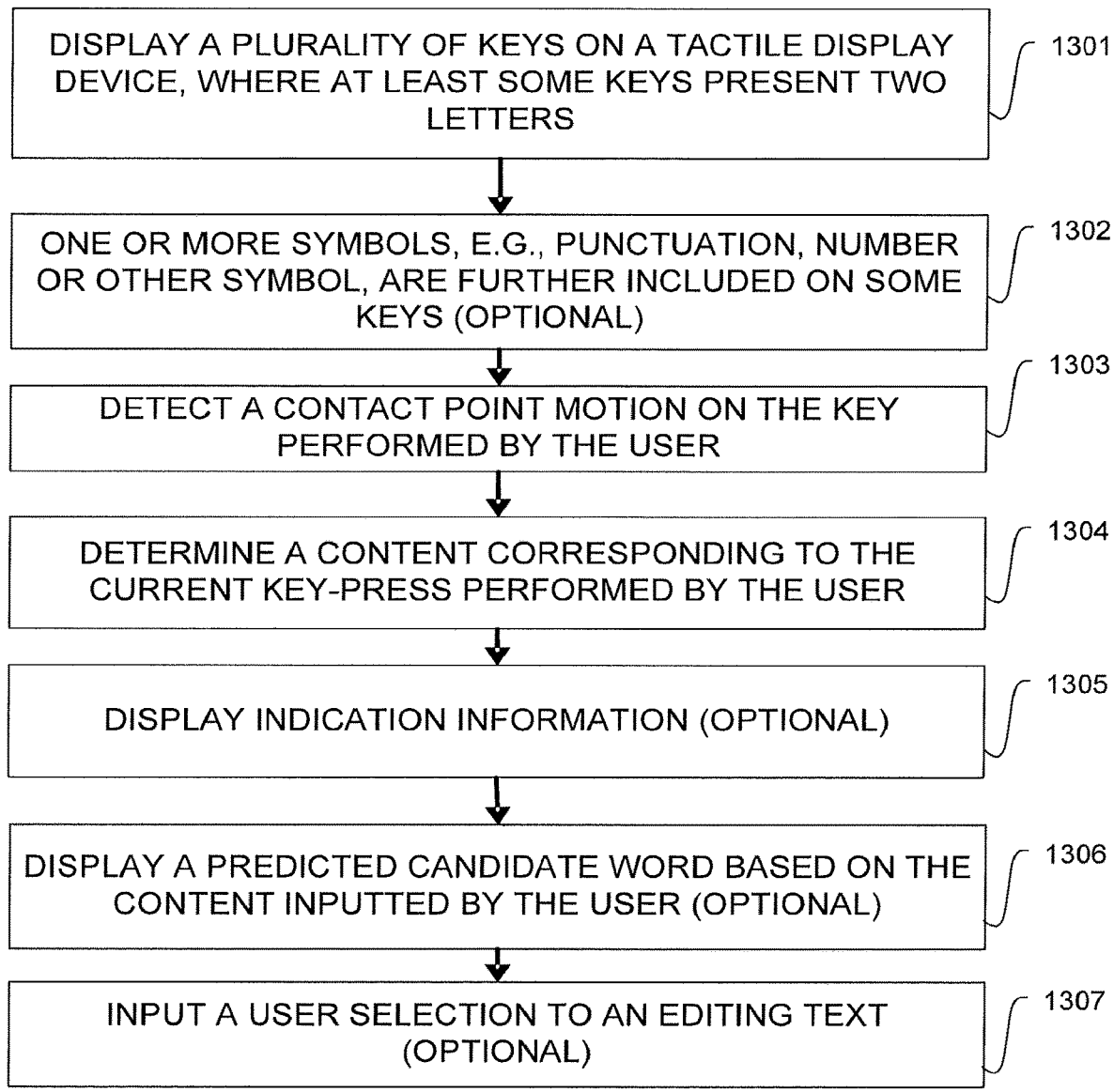
FIG. 13 is a flowchart illustrating an input procedure of a software keyboard according to the second embodiment of the present invention.

FIG. 13 is a flowchart illustrating a procedure of the input method according to the second embodiment of the present invention. The procedure includes the following steps. Step 1301: Display a plurality of keys on a tactile display device, where at least some keys present two letters. Step 1302 (optional): One or more symbols (e.g., punctuation, number or other symbol) are further included on some keys. Step 1303: Detect a contact point motion on the key performed by the user. Step 1304: Determine a precise content corresponding to the current key-press performed by the user. Step 1305 (optional): Display indication information. Step 1306 (optional): Display a predicted candidate word based on the content inputted by the user. Step 1307 (optional): Input a user selection to an editing text.

In terms of step 1301, the keyboard layout thereof may be the QWERTY keyboard layout. When there are two letters on the key, the letters may be in a horizontal layout. Some examples of the keyboard layout may be referred to FIG. 1, FIG. 2, FIG. 3 and FIG. 4. However, the present invention is not limited to these layouts.

In terms of step 1302, when there is one or more symbols on the key, these symbols may be located on the key at an upper part, a lower part, a left part, a right part, a lower left part, a lower right part, an upper left part, or an upper right part. The position of the symbols may be adjusted appropriately based on the position of the existing letter. In some embodiments, the symbol may not be displayed. Thus, this step is optional.

In terms of step 1003, the contact point motion may include pressing and then directly releasing the key; pressing the key, and then releasing the key after moving towards a certain direction for a certain distance; long-pressing the key over a specified period; moving the contact point and then holding on over a specified period, etc.

In terms of step 1004, the determination method may include the following substeps.

1) If the contact point motion is pressing and then directly releasing the key, then the position of the pressed contact point is determined. If the contact point is pressed at the left part of the key, then the left letter on the key is inputted; otherwise, the right letter on the key is inputted.

2) If the contact point motion is releasing the key after moving towards a direction of a certain letter for a certain distance, then it is determined that the content of the present input is the letter in the direction on the key. For example, in FIG. 9, the letter "a" is inputted by moving leftwards on the key 901, and the letter "s" is inputted by moving rightwards. (optional)

3) If the contact point motion is releasing the key after moving towards a direction of a certain symbol for a certain distance, then it is determined that the content of the present input is the symbol in the direction on the key. For example, in FIG. 9, the symbol "*" is inputted by moving downwards on the key 901. The contact point motion may also be long-pressing the key over a specified period, and then inputting the symbol. For example, in FIG. 9, the symbol "*" is inputted after long-pressing the key 901. (optional)

4) If the contact point motion is releasing the key after moving upper-left for a certain distance, then it is determined that the content of the present input is the capital form of the left letter on the key. If the contact point motion is releasing the key after moving upper-right for a certain distance, then it is determined that the content of the present input is the capital form of the right letter on the key. For example, in FIG. 9, the uppercase letter "A" is inputted by moving upper-left on the key 901, and the letter "S" is inputted by moving upper-right on the key 901. (optional)

5) The contact point motion in said substeps 4) and 5) may be changed to releasing the key after long-pressing over a specified period for inputting the uppercase letter. For example, in FIG. 9, the uppercase letter "A" may be precisely inputted by long-pressing the key 901 after moving the contact point leftwards for a certain distance. The uppercase letter "S" may be precisely inputted by long-pressing the key 901 after moving the contact point rightwards for a certain distance. If the contact point is released after long-pressing at the original position, the capital form of the letter may be determined via substep 1). (optional)

In terms of step 1305, the contents of the current input may be dynamically displayed in the indication area (e.g., above the pressed key).

In terms of step 1306, the input method may search the words in the dictionary (which may include a user-defined dictionary) based on the letters inputted by the user, and may display the possible candidate words in the word candidate area.

In terms of step 1307, the user may keep the inputted contents, or may click a candidate word in the candidate area to input it to the editing text, or may use a shortcut key (e.g., SPACE or Enter key) to automatically input the first candidate word to the editing text.

Although the procedure 1300 of the input method includes a series of steps performed in sequence, apparently, the procedure may include more or less steps. And the steps may be performed in series or in parallel (e.g., using a multithread processor), or several steps may be combined into one step, or only the combination of some steps may be selected, or the contact point motions may be changed. For example, it is very easy for a person of ordinary skill in the art to design an input method based on the spirit of the present invention, where the symbol is not displayed (i.e., without step 1302) while the double-letter layout as well as ambiguous and precise input approaches are still adopted; or to design another input method, where substeps 4) and 5) in step 1304 are omitted, i.e., without fast switching uppercase and lowercase letter; or to design another input method, where the condition of the contact point motion in step 1304 is changed to inputting the symbol by double-click, etc. Apparently, such changes will not compromise the essentials of the present invention.

The foregoing layouts are designed based on English keyboard. However, it is readily appreciated by a person of ordinary skill in the art that the layouts may also be applied to a keyboard in other languages, e.g., German keyboard, French keyboard, etc. Usually, the layout of the keyboards in these languages may differ from the English keyboard. However, the benefits of high input efficiency and large keys, etc., may also be embraced, as long as the keyboards are modified similarly to the double-letter layout of the present design by referring to the computer keyboard layout. Therefore, such changes will not compromise the essentials of the present invention either.

It is to be noted that the "tactile display device" according to the present invention is applicable to any electronic device screen with indication input system. The electronic device screen may include, but not limited to, pressure-sensitive touch screen, electromagnetic induction touch screen, mouse indicative touch screen, etc. These screens share the common characteristics of having a contact point with coordinate position information together with the motion corresponding to pressing and releasing operations. For example, the coordinate position information is included when the touch screen is pressed, and the coordinate position information is also included when the left part of the mouse is pressed.

Figure 14:
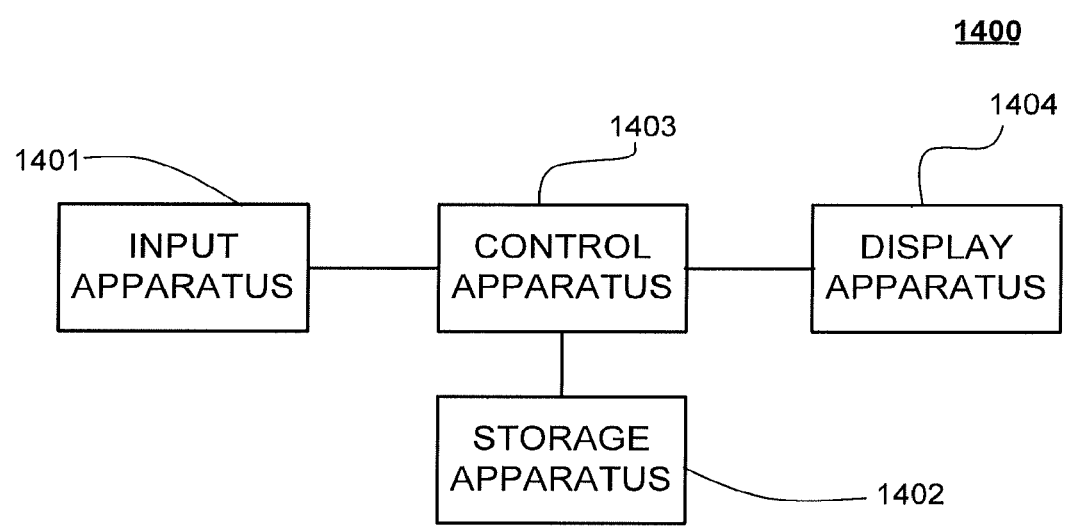
FIG. 14 is a basic block diagram of a computer device or portable terminal device which is applicable to the input method of the present invention.

FIG. 14 is a basic block diagram illustrating a computer device or portable terminal device 1400 which is applicable to the software keyboard input method of the present invention. A user input apparatus 1401 is configured to receive a user input command. The user input apparatus 101 includes a touch screen, or an electronic device screen equipped with a pointing system (e.g., a mouse, an inductive plate, etc.). A storage apparatus 1402 stores basic program commands that support routine work for the computer device or portable terminal device, e.g., operating system, common software, etc. In addition, the storage apparatus 1402 further stores computer program commands for implementing a text input method according to the below embodiments of the present invention. Moreover, the storage apparatus 1402 further stores a dictionary and user configured information, etc. A control apparatus 1403 may be implemented by any kind of microprocessor, micro control and programmable logic element, dedicated integrated circuit or similar device in the conventional art. The control apparatus 1403 is configured to implement the software keyboard input method according to the present invention. A display apparatus 1404 is configured to provide the user with a visional interface illustrating the user input text, together with the foregoing keyboard layout, the key, the candidate word, the editing text, and a control process thereof. The display apparatus may be separated from the user input apparatus 1401, or may be integrated with the user input apparatus 1401, e.g., a touch and display plate.

In the specification herein, the specific embodiments are provided for illustration of the present invention. However, it is apparent that various modifications and variations can be made without departing from the spirit and scope of the present invention. Thus, the specification and the annexed drawings shall be construed as illustrations for the present invention, as the invention is not so limited.

The invention claimed is:

1. A method of implementing a software keyboard on an electronic device, comprising:
    displaying a software keyboard comprising a plurality of compound keys on a tactile display of the electronic device;
    detecting, by a user input apparatus of the electronic device, a contact point motion on a compound key;
    determining, by a processor, whether said contact point motion is a precise input or an ambiguous input, when the contacted compound key comprises at least two letters arranged side by side;
    when said contact point motion is a precise input, determining the compound key that said contact point motion started on and a direction of the contact point motion on the compound key, and choosing an input result that the same contact motion pointed to from the at least two letters included in the compound key; and
    when said contact point motion is an ambiguous input, enumerating, based on an input sequence of the compound key, one or more words in a candidate area, each word having one or more letters meeting the input sequence of the compound key, determining the input result to be any one of the at least two letters on the compound key, and finalizing the input result after a word in the candidate area is selected by a user.

2. The method of claim 1, wherein at least one compound key comprises two letters and one symbol, and said two letters are arranged side by side.

3. The method of claim 2, wherein, when said contact point motion is the precise input and the contacted compound key represents two letters arranged side by side and one symbol, said choosing the input result comprises choosing a letter or a symbol of the contacted compound key as the input result, wherein said chosen letter or symbol is associated with the compound key according to the direction and the distance of the contact point motion.

4. The method of claim 2, wherein, when said contact point motion is the ambiguous input and the contacted compound key represents two letters arranged side by side and one symbol, the symbol on the contacted compound key does not function during the ambiguous input.

5. The method of claim 1, wherein, when the contact point motion is the ambiguous input, said determining the input result comprises: when the contact point motion is a sliding motion having an upwards or a downwards direction, the corresponding input result is an uppercase of any one of the letters on the compound key.

6. The method of claim 1, wherein, when said contact point motion is the precise input, said choosing the input result associated with the compound key according to the direction and the distance of the contact point motion comprises:
    when the contact point motion is a sliding motion having a upper left direction, the corresponding input result is the upper case of the letter residing in the left side of the compound key; and
    when the contact point motion is a sliding motion having a upper right direction, the corresponding content is the upper case of the letter residing in the right side of the compound key.

7. The method of claim 1, wherein said displaying software keyboard further comprises: setting a width of each of the plurality of compound keys to an even number of pixels.

8. The method of claim 1, further comprising dynamically displaying the current input result in an indication area above the contacted key.

9. A portable terminal device with a software keyboard implemented, comprising:
    a display apparatus that displays said software keyboard, wherein said software keyboard comprises a plurality of compound keys;
    a user input apparatus that receives a contact point motion associated with a compound key of said software keyboard;
    a processor that determines whether said contact point motion is a precise input or an ambiguous input, when said contacted compound key comprises at least two letters arranged side by side;
    wherein, when said contact point motion is a precise input, the processor determines the compound key that said contact point motion started on and a direction of the contact point motion on the compound key, and chooses an input result that the same contact point motion pointed to from the at least two letters included in the compound key, and
    when said contact point motion is an ambiguous input, the processor enumerates, based on an input sequence of the compound key, one or more words in a candidate area, each word having one or more letters meeting the input sequence of the compound key, determines the input result to be any one of the at least two letters on the compound key, and finalizes the input result after a word in a candidate area is selected by a user.

10. The device of claim 9, wherein at least one compound key comprises two letters and one symbol, and said two letters are arranged side by side.

11. The device of claim 10, wherein, when said contact point motion is the precise input and when the contacted compound key represents two letters arranged side by side and one symbol, the processor chooses a letter or a symbol of the contacted compound key as the input result, wherein said chosen letter or symbol is associated with the compound key according to the direction and the distance of the contact point.

12. The device of claim 10, wherein, when said contact point motion is the ambiguous input and when the contacted compound key represents two letters arranged side by side and one symbol, the symbol on the contacted compound key does not function during the ambiguous input.

13. The device of claim 9, wherein, when the contact point motion is the ambiguous input and when the contact point motion is a sliding motion having an upwards or a downwards direction, the corresponding input result is an uppercase of any one of the letters on the compound key.

14. The device of claim 9, wherein, when said contact point motion is the precise input,
    when the contact point motion is a sliding motion having a upper left direction, the corresponding input result is the upper case of the letter residing in the left side of the compound key;

when the contact point motion is a sliding motion having a upper right direction, the corresponding content is the upper case of the letter residing in the right side of the compound key.

15. The device of claim 9, wherein said display apparatus displays the software keyboard by setting a width of each of the plurality of compound keys to an even number of pixels.

16. The device of claim 10, wherein said display apparatus dynamically displays the current input result in an indication area above the contacted key.

* * * * *